(12) United States Patent
Tea

(10) Patent No.: US 10,552,618 B2
(45) Date of Patent: Feb. 4, 2020

(54) METHOD AND APPARATUS FOR TRANSMISSION OF VISUALLY ENCODED DATA

(71) Applicant: GIESECKE & DEVRIENT GMBH, Munich (DE)

(72) Inventor: Vui Huang Tea, Stockholm (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 410 days.

(21) Appl. No.: 14/888,503

(22) PCT Filed: Apr. 30, 2014

(86) PCT No.: PCT/EP2014/001160
§ 371 (c)(1),
(2) Date: Nov. 2, 2015

(87) PCT Pub. No.: WO2014/177278
PCT Pub. Date: Nov. 6, 2014

(65) Prior Publication Data
US 2016/0110552 A1 Apr. 21, 2016

(30) Foreign Application Priority Data
May 2, 2013 (EP) .................................... 13002340

(51) Int. Cl.
*H04L 29/06* (2006.01)
*G06F 21/60* (2013.01)
(Continued)

(52) U.S. Cl.
CPC .......... *G06F 21/602* (2013.01); *G06F 21/606* (2013.01); *G06K 19/06037* (2013.01);
(Continued)

(58) Field of Classification Search
CPC ................ G06F 21/602; G06F 21/606; G06K 19/06037; G06K 19/06103; G06Q 20/3276; G09C 5/00; H04L 9/3297
See application file for complete search history.

(56) References Cited

U.S. PATENT DOCUMENTS

2010/0211787 A1* 8/2010 Bukshpun ............. H04L 9/0838
713/170
2012/0138679 A1* 6/2012 Doyle ............... G06K 19/06037
235/380
(Continued)

FOREIGN PATENT DOCUMENTS

WO 2012028867 A1 3/2012

OTHER PUBLICATIONS

European Search Report for corresponding European Application No. EP13002340, dated Oct. 30, 2013.
(Continued)

*Primary Examiner* — Yogesh Paliwal
(74) *Attorney, Agent, or Firm* — Workman Nydegger

(57) ABSTRACT

A method for secured data transmission of visually encoded data from a mobile end device to a processing unit includes supplying on a security element of the end device a datum to be transmitted. The datum is encrypted in session-specific fashion through the security element. From the encrypted datum visually encoded image data are generated in the form of a bar code or a sequence of bar codes. The visually encoded image data are displayed through the end device.

11 Claims, 3 Drawing Sheets

(51) Int. Cl.
*H04L 9/32* (2006.01)
*G09C 5/00* (2006.01)
*G06Q 20/32* (2012.01)
*G06K 19/06* (2006.01)

(52) U.S. Cl.
CPC ... *G06K 19/06103* (2013.01); *G06Q 20/3276* (2013.01); *G09C 5/00* (2013.01); *H04L 9/3297* (2013.01)

(56) References Cited

U.S. PATENT DOCUMENTS

| | | |
|---|---|---|
| 2012/0253852 A1 | 10/2012 | Pourfallah et al. |
| 2014/0013406 A1* | 1/2014 | Tremlet ................. G06F 21/32 726/5 |

OTHER PUBLICATIONS

Fiedler, "Giesecke & Deverient Mobile Verification for Document and Product Tracing Content," Jul. 7, 2011, URL: http://www.taxadmin.org/fta/meet/11tech/pres/Fiedler_MobileV_G&D.pdf.

Hebbes et al., "2-Factor Authentication with 2D Barcodes," Proceedings of the Fifth International Symposium on Human Aspects of Information Security & Assurance, Jul. 8, 2011, pp. 86-96.

International Search Report for corresponding International PCT Application No. PCT/EP2014/001160, dated Feb. 17, 2015.

Kato et al., "2D Barcodes for Mobile Phones," Mobile Technology, Applications and Systems, 2005 2nd International Conference on, Guangzhou, China, Nov. 15-17, 2005, pp. 1-8.

* cited by examiner

METHOD AND APPARATUS FOR TRANSMISSION OF VISUALLY ENCODED DATA

BACKGROUND

The present invention relates to a method for secured transmission of visually encoded data, in particular for visual transmission of bar codes, from a mobile end device to a processing unit. The invention further relates to a security element, a mobile end device having such a security element, a processing unit and a system comprising at least one mobile end device and at least one processing unit.

Bar codes, in the form of 1D and 2D bar codes, have been traditionally affixed on printed matter and on physical objects to be read by appropriate bar code scanners. There are many types of bar codes, such as PDF417, microPDF417, MaxiCode, DataMatrix (standard, inverse), QR Code (standard, inverse and micro), Han Xin, Aztec (standard, inverse), etc. and variants. These codes generally work with the same imaging principle.

With increasing availability of mobile devices with autofocus cameras and bar code scanners, bar codes, in particular 2D bar codes, have started to gain a big role in mobile marketing. The subscribers use their mobile phone to read a bar code that will bring them to a website, display information, and send SMS, etc. The next stage of mobile bar code has started gaining traction, and that is to issue boarding passes, tickets, store cards, coupons, etc. to the mobile phones and to display these bar codes to be read by a cashier, movie counter, shops, etc. Although the same types of bar codes are used, new sets of unanticipated problems have emerged that have never been addressed in prior use cases with printed bar codes.

One of these problems is, for example, that mobile bar codes normally display the underlying data in plain text. In this way, sensitive data, such as for example transaction data, become visible every time a user displays a corresponding bar code. In this way, sensitive data may come into the hands of unauthorized third parties and an undesirable copying of the bar codes coding these data can hardly be prevented.

An encryption of the data, which are displayed through a bar code, by means of a securing key before the generation of the bar code may only partially solve these problems. In case an attacker succeeds in breaking the securing key, all the bar codes encrypted before and in the following by means of the securing key would be compromised.

SUMMARY

It is the object of the present invention to propose a method and a system, which make it possible to transmit visually encoded image data, in particular bar codes, in simple and secure fashion.

This object is achieved by a method, a security element, a mobile (end) device having a security element, a processing unit, and a system with the features of the independent claims. Advantageous embodiments and developments are stated in the dependent claims.

A method according to the invention for secured data transmission of visually encoded data from a mobile (end) device to a processing unit comprises the following steps:

On a security element of the end device a datum to be transmitted is supplied. This can be transaction data, for example in the form of a ticket, in particular a transport ticket, a coupon, or the like.

In a next step, the datum is encrypted in session-specific fashion through the security element. Suitable, known encryption methods can be used, employed keys and/or other auxiliary data, which influence the encryption, being supplied in a modified form for each encryption operation.

Subsequently, from the encrypted datum visually encoded image data are generated, preferably in the form of a bar code or a sequence of bar codes. All the known, suitable coding systems and methods can be employed here.

Finally, the visually encoded image data are displayed through the end device, preferably via a display or the like.

A security element according to the invention is adapted to be temporarily or permanently integrated into a mobile end device and comprises a supplying unit. The supplying unit is adapted to supply a datum, for example in the form of the above-mentioned transaction data, i.e. in particular to generate it or to receive it in secured fashion from an external entity. Preferably, the datum is (permanently) stored in a non-volatile memory of the security element. Accordingly, a datum existing on the security element may be supplied at a point of time independent of the creation of the datum and/or the storage of the datum in the security element.

The security element further comprises an encryption unit which is adapted to encrypt the supplied datum in session-specific fashion.

A mobile end device according to the invention comprises a security element according to the invention and is adapted to carry out a method according to the invention.

A processing unit according to the invention comprises a reading device. The reading device is adapted to capture visually encoded image data generated in accordance with a method according to the invention and displayable through the end device.

A decoding unit of the processing unit is adapted to decode the captured, visually encoded image data to the encrypted datum.

A decryption unit of the processing unit is adapted to decrypt the encrypted datum.

The system according to the invention, finally, comprises at least one end device according to the invention as well as at least one processing unit according to the invention.

The invention allows a simple and secure data transmission of visually encoded image data from a mobile end device to a processing unit. Due to the fact that the data to be encrypted are already supplied on the security element of the end device and are also encrypted there, security-relevant data, such as for example transaction data, personal data, or the like, do not come into an unsecured environment at any time, such as the image data generation unit of the end device, an unsecured data transmission channel or the like. By the encryption being done in session-specific fashion, i.e. for each encryption operation a new key being employed, a possible spying out of a single encryption key of the security element has no effect on past and/or future encryption operations. In other words, the overall security of the system is maintained.

The term "session-specific" in the present context is to be interpreted broadly. No fixed scheme of session keys is necessary. What is being claimed is only that keys and/or further auxiliary data used to encrypt the datum, which relate to and influence the encryption, such as for example pseudo-random numbers, physical random data, internal counters or the like, are respectively supplied in a modified form for different encryption operations, also for encrypting identical data.

For the encryption per se there can be employed known and tested methods, such as for example Triple-DES. Also encryption methods based on asymmetric key architectures can be used.

Also the term "visually encoded image data" is to be interpreted broadly, but is to comprise in particular bar codes. This relates in particular to all common and known types of one- and two-dimensional bar codes. In the same way, the term "visually encoded image data" is to comprise, however, also other visually representable codes, such as for example dot codes, color codes, icons and the like.

The datum to be encrypted and to be transmitted can be generated in the security element or received in secured fashion, for example via an encrypted data transmission, by the security element in the step of its supplying. In both cases it is ensured that the datum is protected from unauthorized access already from the beginning of a transaction.

As mentioned above, in the step of encrypting the datum in session-specific fashion, auxiliary data that are variable in session-specific fashion can be used, such as for example dynamically variable session keys and/or pseudo-random numbers.

The auxiliary data that are variable in session-specific fashion can here be supplied through the security element. Preferably, the auxiliary data that are variable in session-specific fashion are generated in the security element itself or captured by the security element, for example in the form of temporarily measurable physical values, such as a signal strength of a signal, a network time, or the like. It is also possible that the security element receives the auxiliary data that are variable in session-specific fashion and/or a rule for generating the auxiliary data that are variable in session-specific fashion from a background system in secured fashion.

According to a preferred embodiment of the invention, the encrypted datum is transmitted to the end device through the security element. The end device then generates from the encrypted datum the visually encoded image data, for example a bar code or a sequence of bar codes.

Alternatively, however, also the security element can generate the visually encoded image data from the encrypted datum, and only then transmit the visually encoded image data to the end device for display. In this case, also the security element comprises an image data generation unit which is adapted to generate from the encrypted datum the visually encoded image data.

Preferably, the visually encoded image data comprise an identifier or the like, on the basis of which the security element that supplies and encrypts the datum to be encrypted and to be transmitted and/or the end device that displays the visually encoded image data can be uniquely identified. Employable identifiers are for example IMSI and IMEI. IMSI ("International Mobile Subscriber Identity") serves for unique identification of network participants in GSM and UMTS mobile radio networks. The "International Mobile Station Equipment Identity" (IMEI) is a unique serial number on the basis of which each GSM or UMTS end device can be uniquely identified.

In order for the method for secured data transmission to be completed, further steps can be provided. The visually encoded image data displayed through the end device are captured here through a reading device of the processing unit. This reading device can be for example a common camera unit or scanner unit. In a further step, the captured, visually encoded image data are decoded, in order to obtain again the encrypted datum. In a final step, the encrypted datum is decrypted through the decryption unit of the processing unit. The processing unit can then process the decrypted transaction data in the desired fashion or pass them on to a further entity—in secured fashion—for processing.

The above-described components of the processing unit can be combined in a single device or, however, can be present in modular fashion as a plurality of separate devices coupled with each other. In other words, for example the reading device can be present as a separate device, for example as a hand-held scanner or the like. Scanned, i.e. captured data are then transmitted, preferably in contactless fashion, to the decoding unit for decoding. In the same fashion, the decoded data can be transmitted, in contact-type or contactless fashion, from the decoding unit to the decryption unit for decryption. Decoding and decryption unit can also be modules of one device, however.

The system according to the invention can further comprise a background system. This background system can be adapted to coordinate the encryption and decryption of the transmitted data between the security element and the decryption unit of the processing unit. In other words, the background system is adapted to equip the security element and the processing unit with the encryption keys and decryption keys, respectively, current random data or the like that are to be respectively used. Alternatively, the background system can supply the security element and the processing unit with methods and rules for the synchronous generation of such keys and/or further auxiliary data. Activating and updating the security element and decryption unit is normally effected in secured fashion via an over-the-air interface (OTA) through the background system.

BRIEF DESCRIPTION OF THE DRAWINGS

The present invention will hereinafter be described by way of example with reference to the attached drawings. Therein are shown.

DETAILED DESCRIPTION OF VARIOUS EMBODIMENTS

Figure 1:
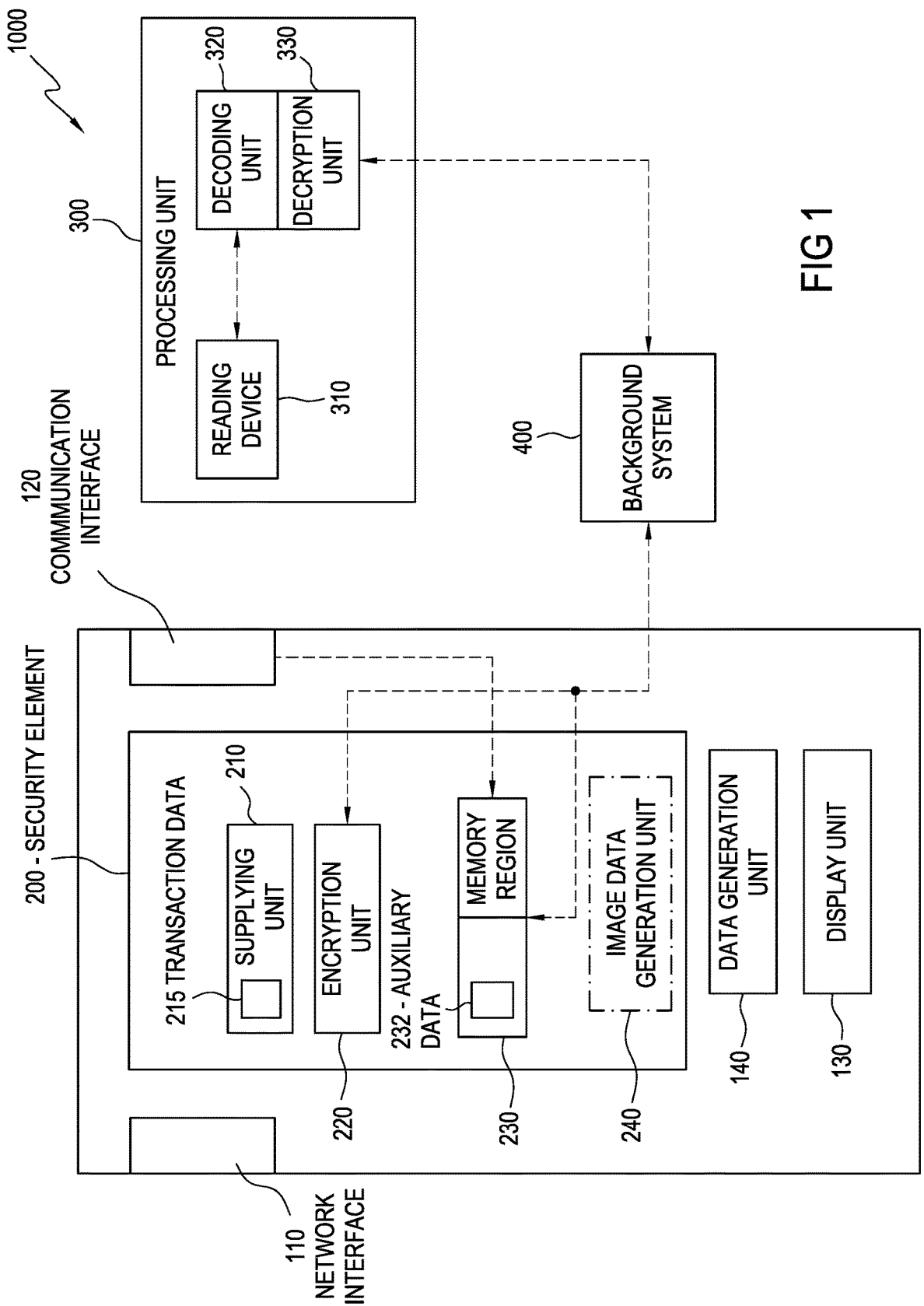
FIG. 1 components of a preferred embodiment of a system according to the invention.

The system 1000 schematically shown in FIG. 1 comprises a mobile end device 100 having a security element 200, a processing unit 300 as well as a background system 400.

The mobile end device 100 can be configured for example as a smart phone, tablet computer, mobile radio end device, notebook, wearable device (smart watch, smart glasses . . . ) and the like.

The mobile end device 100 comprises a network interface 110 for communication via a data network, for example a mobile radio network or the Internet. Furthermore, the end device 100 comprises a communication interface 120 for contactless near-field data communication, for example in the form of an NFC interface. An image data generation unit 140 serves to generate visually encoded image data, in particular two-dimensional bar codes, in order to represent data, which were received from the security element 200. These image data can then be displayed via a display unit 130 of the end device 100, for example a display, for the optical capturing through a suitable reading device 310.

The security element 200 comprises a supplying unit 210 for supplying transaction data 215, an encryption unit 220 for encrypting the transaction data 215, as well as, optionally, an image data generation unit 240 which can also be adapted to generate visually encoded image data from a data set.

The security element 200 can be provided as a security element temporarily integratable into the end device 100 or firmly installed therein. Removably integratable security elements are for example SIM/UICC mobile radio cards, secure multimedia cards or the like. As security elements 200 firmly installed in the end device 100 there can serve for example embedded SIM/UICC mobile radio cards, TPMs ("Trusted Platform Modules") or NFC modules. Finally, also secure execution environments within a specific hardware architecture of the end device 100, for example within an ARM TrustZone architecture, can serve as security elements 200, such as for example a "trusted execution environment" according to the "Global Platform" specification.

The supplying unit 210 can be a portion of a so-called wallet application. The wallet application comprises here a portion (not shown) which is executed on the end device 100 and which serves as an interface and integration point for various portions installable on the security element 200. These portions of the wallet application, which are arranged on the security element side, can comprise for example payment applications, ticket applications or the like. The supplying unit 210 can generate transaction data 215 and/or receive them via a secured data transmission channel, for example from an assigned service provider.

The encryption unit 220 is adapted to encrypt the transaction data 215 in session-specific fashion. Session keys 232 dynamically generated on the part of the security element 200 can be stored in a memory region 230 of the security element. There, keys for encrypting a data communication carried out via the NFC interface 120 can be optionally stored.

The generation of the dynamically generated session keys 232 in the security element 200 can be coordinated through the background system 400 with a corresponding generation of session keys necessary for the decryption in the decryption unit 330 of the processing device 300. The encryption unit 220 of the security element 200 and the decryption unit 330 of the processing unit 300 are activated once, when required, by the background system 400 and updated as needed, for example via an over-the-air interface (OTA). In this connection, known hardware security modules can be used, for example in the form of M2M (machine-to-machine) SIM mobile radio cards or the like.

The processing device 300 comprises a reading device 310, a decoding unit 320, and, as already mentioned, a decryption unit 330. The reading device 310, which can be configured for example as a mobile hand-held device, is adapted to optically capture visually encoded image data displayed via the display unit 130 of the end device 100, for example by means of a camera unit or scanner unit.

The decoding unit 320 is adapted to decode the visually encoded image data, i.e. normally the represented two-dimensional bar codes. And, finally, the decryption unit 330 is adapted to decrypt the decoded image data, which correspond to encrypted transaction data 215, as described in detail below, and process them further or pass them on to a unit for processing.

Figure 2:
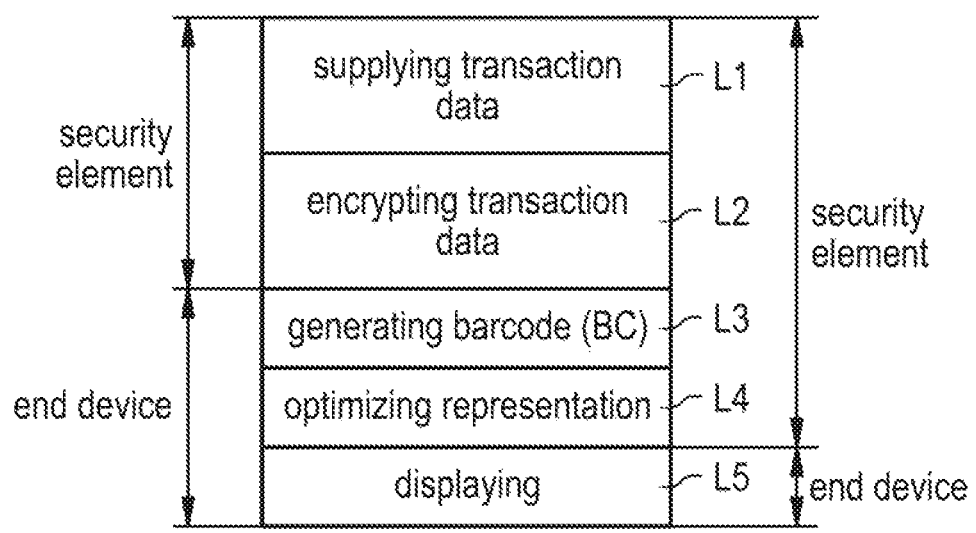
FIGS. 2 and 3 different application layers within a security element and a mobile end device according to preferred embodiments.
Figure 3:
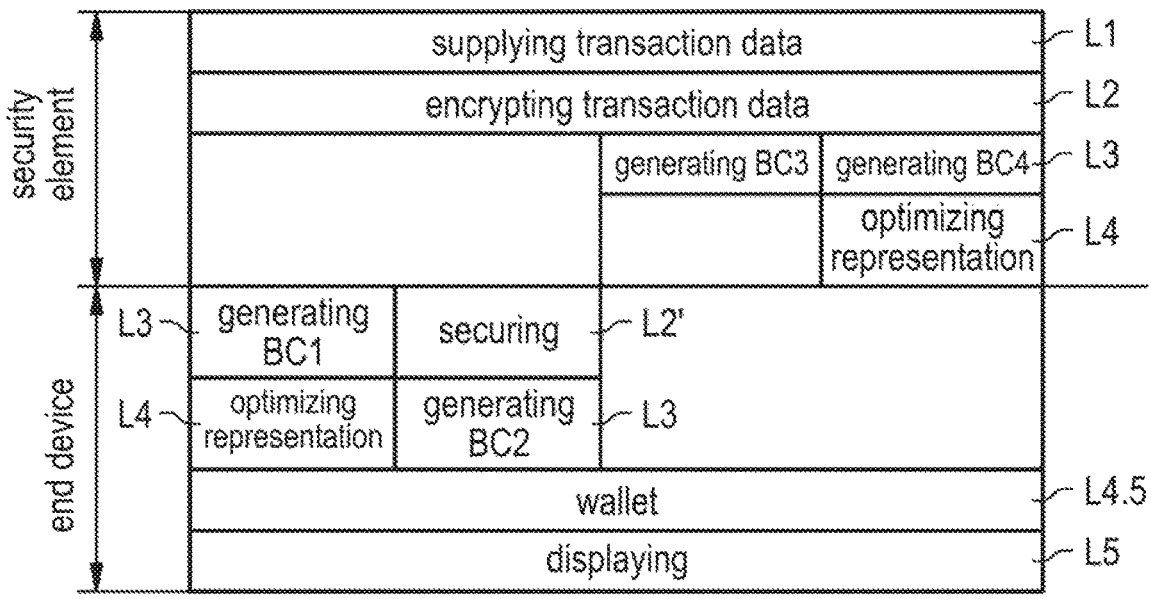
Figure 4:
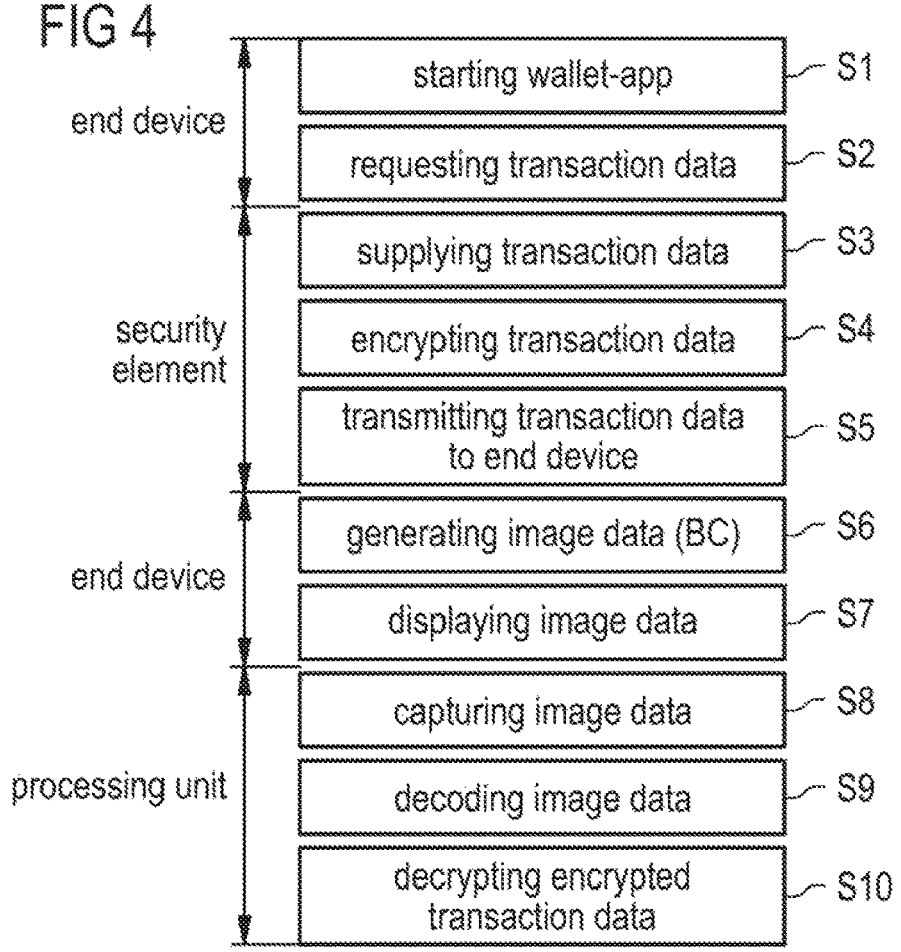
FIG. 4 steps of a preferred embodiment of a method according to the invention for visually transmitting a data set from a mobile end device to a processing unit.

The FIGS. 2 and 3 show by way of example different layers of the data processing within the framework of a method for the secured data transmission of visually encoded data, as it is described in detail in the following with reference to FIG. 4.

At the lowest level L1, in the security element 200 there are supplied data which by way of example are described as transaction data 215. The transaction data 215 may correspond for example to a mobile transport ticket in public transport, a ticket for an event, or the like.

The transaction data 215 can be generated or received from a corresponding service provider via a secured data transmission, for example via SMS, in the supplying unit 210, as mentioned above.

At the next level L2, the transaction data 215 supplied through the supplying unit 210 are encrypted in session-specific fashion still within the security element 200 in the above-described fashion through the encryption unit 220.

The functionalities of the levels L1 and L2 are always supplied within the security element 200.

According to a first embodiment of the invention, the further functionalities represented in FIG. 2 with reference to the levels L3 and L4 are supplied through the end device 100.

At the level L3, on the basis of encrypted transaction data there are generated visually encoded image data, in particular bar codes. This is normally done through the image data generation unit 140 of the end device 100, which receives the corresponding encrypted transaction data 215 from the security element 200.

Optionally, the image data can be optimized for display on the specific end device 100. For this purpose, the end device 100 can comprise a corresponding optimization unit (not shown) This optimization unit uses here representation optimization values specific to the end device, which state in particular the technical conditions of the end device, for example the dimension of the display, the resolution of the display, and the like. The representation optimization values can be stored in the security element 200 or the end device 100 or can be requested from an external service.

According to a second embodiment of the invention, the functionalities of the levels L3 and L4 can also be supplied on the security element 200. Only the functionality of the level L5, the display of an, where applicable, optimized visually encoded image datum, which means of one or more bar codes, is always effected through the end device 100 via the display unit 130.

In FIG. 3, the general scheme represented with reference to FIG. 2 is illustrated in a refined form.

The end device 100 can comprise, as mentioned above, a so-called wallet application (cf. level L4.5). This wallet application can be adapted to serve as an interface to the end device for different applications supplied on the security element. Each of these applications on the security element 200 can supply and encrypt transaction data of various types. Dependent on the application, it can be provided that the encrypted transaction data are directly passed on to the end device 100 for generation of a first type of bar code (BC1). The end device 100 can optionally effect, as mentioned above, a downstream optimization for representation on the end device 100.

On the end device side, there can also be provided a further securing layer, completely independent of the encryption through the security element 200, however, (layer L2'). This layer is normally upstream of a generation of image data, for example of a bar code BC2. It is evident that the additional securing and the device optimization can also be combined.

Other wallet applications arranged on the security element side can provide not only a supplying and encryption of transaction data 215, but also the generation of the bar codes (BC3) as well as, where applicable, even a device optimization of the bar codes (BC4), on the basis of suitable representation optimization values.

In other words, different applications on the security element 200, including the supplying unit 210, can provide a generation of different bar codes (BC1 to BC4), which in part are generated already on the security element 200 and, where applicable, are optimized for the end device 100. On the other hand, such an application may merely carry out the supplying and encryption of the transaction data. Then the generation of the visually encoded image data and, where applicable, a further encryption or securing of these data as well as an optional optimization for representation is incumbent on the end device 100.

Substantial steps of a method for secured data transmission of visually encoded data from a mobile end device 100 to a processing unit 300 are illustrated with reference to FIG. 4.

The data transmission can be part of any arbitrary transaction, for example the control of a transport ticket in the form of a mobile bar code. The mobile end device 100 is for example a smart phone of a user, the processing device 300 is associated to the provider of the public transport service and comprises a mobile reading device 310 which is carried along by a locally working ticket inspector. Decoding and decryption unit 320, 330 can also be integrated into the reading device 310. But normally, the data captured by means of the reading device 310 are passed on, for example via mobile radio, to a stationary residing processing system for decoding, decrypting and further processing.

Corresponding transaction data 215, in the above-mentioned example the transport ticket, have been generated in upstream (not shown) and already explained steps or have been received by the security element 200.

As illustrated with reference to step S1, for carrying out the transaction an application is started on the end device side, for example the already repeatedly mentioned wallet application.

The wallet application requests in step S2 the mobile bar code from the security element 200 that can be present for example as a SIM mobile radio card.

Steps S1 and S2 are thus carried out on the side of the end device 100.

Within the framework of not shown optional steps, it can be provided that the user of the end device 100 enters additional data via an input unit (not shown) of the end device 100. These additional input data can be passed on by the wallet application, i.e. the portion on the device side, to the security element 200. These additional input data can then be included in the generation of the visually encoded image data, in addition to the transaction data 215 supplied through the security element 200.

It can also be provided that for starting the portion of the wallet application that is executed on the security element 200, the entering of a password or the like is necessary. This password is then likewise passed on to the security element 200 and evaluated there before the method is continued in the way described below.

In step S3 the security element 200 supplies by means of the supplying unit 210 the requested transaction data 215 underlying the necessary mobile bar code, and passes them on to the encryption unit 220.

In the encryption unit 220 the transaction data 215 are encrypted in session-specific fashion. This is represented with reference to step S4.

The encrypted transaction data 215 are transmitted in step S5 to the end device 100, more precisely to the image data generation unit 140.

The end device 100 now generates in step S6 by means of the image data generation unit 140 the mobile bar code and displays this on the display unit 130, i.e. a display, in step S7.

The reading device 310 of the processing unit 300 captures in step S8 the displayed mobile bar code and passes the captured data on to the decoding unit 320.

There, the captured data are decoded, thereby recovering the transaction data 215 encrypted in step S4. The decryption of the transaction data 215 is done in step S10 through the decryption unit 330.

Optionally, there can additionally be provided a transmission of visually encoded image data in the reverse direction, i.e. from processing device 300 to mobile end device 100, for example in order to transfer transaction response data.

For this purpose, the processing device 300 comprises a display unit (not shown), for example a display, for displaying such data, for example again in the form of one or several bar codes which can be based on encrypted or unencrypted response data.

The mobile end device 100 then additionally comprises a capturing unit (not shown), for example in the form of a camera, for capturing the one or more bar codes, as well as a decoding unit for decoding the same, in order to obtain the underlying transaction response data.

In case these transaction response data have been encrypted on the part of the processing device 300, the end device 100 can perform a decryption by means of a decryption unit provided for this purpose. A coordination of the keys and auxiliary data necessary for encryption and decryption can be performed by the background system 400 in the above-described fashion also for this direction of data transmission.

In the described way, a secured data transmission between a mobile end device 100 and a processing unit 200 of a service provider by means of visually encoded image data, in particular two-dimensional bar codes, can be effected in a fashion easy to understand and easy to handle. Sensitive data do not come in unencrypted fashion into the access area of unauthorized third parties at any time, because supplying and encryption of these data is always effected in a secured environment, in particular in the security element 200 of the end device 100. By the encryption being additionally effected in session-specific fashion, the security of the method is additionally significantly increased. Individual auxiliary encryption data possibly spied out cannot endanger the security of data encrypted before or thereafter.

The invention claimed is:

1. A method for secured data transmission of visually encoded data from a mobile device to a processing unit, comprising the steps of:
   supplying a datum on a security element of the mobile device;
   encrypting the datum in session-specific fashion through the security element, the session-specific encryption using keys and/or further auxiliary data in a modified form to encrypt the datum for different encryption operations, such that for each encryption operation a new key is employed;
   generating visually encoded image data from the encrypted datum;

displaying the visually encoded image data through the mobile device;

wherein the security element is further provided with an image data generation application which is adapted to generate visually encoded image data from an encrypted datum; and wherein the visually encoded image data are generated in such a way that the image data comprise an identifier identifying the security element and/or the mobile device, and the encrypted datum.

2. The method according to claim 1, wherein the datum is generated in the security element or received in secured fashion by the security element in the step of supplying.

3. The method according to claim 1, wherein in the step of encrypting in session-specific fashion for encrypting the datum, the auxiliary data is used comprising dynamically variable keys and/or pseudo random numbers that are variable in session-specific fashion.

4. The method according to claim 3, wherein the auxiliary data that are variable in session-specific fashion are supplied through the security element.

5. The method according to claim 3, wherein the security element receives the auxiliary data that are variable in session-specific fashion and/or a rule for generating the auxiliary data that are variable in session-specific fashion from a background system in secured fashion.

6. The method according to claim 1, wherein the encrypted datum is transmitted to the mobile device through the security element and that the mobile device generates the visually encoded image data.

7. The method according to claim 1, comprising the further steps of:
capturing the displayed, visually encoded image data through a reading device of the processing unit;
decoding the encoded image data to the encrypted datum;
decrypting the encrypted datum.

8. The method according to claim 1, wherein the step of supplying the datum on the security element of the mobile device includes storing the datum in a non-volatile memory of the security element.

9. A security element suitable for temporary or permanent integration into a mobile device and adapted for carrying out a method for secured data transmission of visually encoded data from the mobile device to a processing unit, comprising:
a mobile radio card provided with a supplying application, adapted for supplying a datum on the security element; and
an encryption application, adapted for encrypting the datum in session-specific fashion through the security element, the session-specific encryption using keys and/or further auxiliary data in a modified form to encrypt the datum for different encryption operations, such that for each encryption operation a new key is employed;

wherein the security element is configured to generate visually encoded image data from the encrypted datum and to display the visually encoded image data through the mobile device;

wherein the mobile radio card is further provided with an image data generation application which is adapted to generate visually encoded image data from an encrypted datum; and wherein the visually encoded image data are generated in such a way that the image data comprise an identifier identifying the security element and/or the mobile device, and the encrypted datum.

10. A system comprising:
at least one mobile device having a security element including a supplying application, adapted for supplying a datum on the security element, and an encryption application, adapted for encrypting the datum in session-specific fashion through the security element, the session-specific encryption using keys and/or further auxiliary data in a modified form to encrypt the datum for different encryption operations, such that for each encryption operation a new key is employed, and the security element configured to generate visually encoded image data from the encrypted datum and to display the visually encoded image data through the mobile device;

at least one processing unit comprising:

a reading device, which is adapted to capture the visually encoded image data displayed through the mobile device, a decoding application which is adapted to decode the captured, encoded image data to the encrypted datum, and a decryption application which is adapted to decrypt the encrypted datum;

wherein the security element is further provided with an image data generation application which is adapted to generate visually encoded image data from an encrypted datum;

wherein the visually encoded image data are generated in such a way that the image data comprise an identifier identifying the security element and/or the mobile device, and the encrypted datum.

11. The system according to claim 10, comprising a background system which is adapted to equip the at least one security element with the auxiliary data that are variable in session-specific fashion for encrypting data in session-specific fashion and/or to equip the at least one processing unit with corresponding auxiliary data that are variable in session-specific fashion for decrypting data encrypted in session-specific fashion.

* * * * *